United States Patent
Bush et al.

(10) Patent No.: US 12,414,496 B2
(45) Date of Patent: Sep. 16, 2025

(54) CALIBRATION DEVICE FOR VOLUMETRIC METERS

(71) Applicant: DEERE & COMPANY, Moline, IL (US)

(72) Inventors: Ean M. Bush, Davenport, IA (US); Andrew W. Harmon, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 826 days.

(21) Appl. No.: 17/651,825

(22) Filed: Feb. 21, 2022

(65) Prior Publication Data

US 2023/0076363 A1 Mar. 9, 2023

Related U.S. Application Data

(60) Provisional application No. 63/260,927, filed on Sep. 6, 2021.

(51) Int. Cl.
| | | |
|---|---|---|
| *A01C 7/10* | (2006.01) | |
| *A01B 79/00* | (2006.01) | |
| *A01C 19/02* | (2006.01) | |
| *G01G 11/08* | (2006.01) | |
| *G01G 19/08* | (2006.01) | |

(52) U.S. Cl.
CPC ............ *A01C 7/107* (2013.01); *A01B 79/005* (2013.01); *A01C 19/02* (2013.01); *G01G 11/08* (2013.01); *G01G 19/08* (2013.01)

(58) Field of Classification Search
CPC .. A01C 7/107; A01C 7/10; A01C 7/08; A01C 7/00; A01C 19/02; A01C 19/00; A01B 79/005; A01B 79/00; G01G 11/08; G01G 11/00; G01G 19/08; G01G 19/00
See application file for complete search history.

(56) References Cited

U.S. PATENT DOCUMENTS

| | | |
|---|---|---|
| 3,483,755 A | 12/1969 | Walker et al. |
| 8,408,478 B2 | 4/2013 | Wonderlich |
| 11,191,207 B2 | 12/2021 | Harmon et al. |
| 2011/0056308 A1 | 3/2011 | Henry et al. |

FOREIGN PATENT DOCUMENTS

| | | |
|---|---|---|
| DE | 3248751 A1 | 7/1984 |
| EP | 2420121 A1 | 2/2012 |

OTHER PUBLICATIONS

Extended European Search Report and Written Opinion issued in European Patent Application No. 22182889.0, dated Jan. 2, 2023, in 10 pages.
Agrcitechnica Innovations Magazine, dated 2015, pp. 1-24.
Automatic Calibration for the Solitair 25, dated Nov. 2, 2015, pp. 1-3, [online], [retrieved on Sep. 10, 2021]. Retrieved from the Internet <URL: https://lemken.com/en/lemken-news/news/detail/detail/automatic-calibration-for-the-solitair-25/#>.

*Primary Examiner* — Christopher J. Novosad

(57) ABSTRACT

Systems, methods, and apparatuses for calibrating a first meter of an air cart include determining a calibration factor using a second meter. The second meter may be located with the air cart or remotely from the air cart. An amount of material dispensed from the second meter is used to determine the calibration factor. A number of cycles of operation of the second meter may also be used to determine the calibration factor. The calibration factor may be provided via a wired or wireless connection to a controller operable to control operation of the first meter.

21 Claims, 11 Drawing Sheets

CALIBRATION DEVICE FOR VOLUMETRIC METERS

CROSS REFERENCE TO RELATED APPLICATIONS

This application claims the benefit of U.S. Provisional Application No. 63/260,927, filed Sep. 6, 2021, the entire contents of which are incorporated herein by reference.

FIELD OF THE DISCLOSURE

The present disclosure relates generally to meter calibration and, particularly, to calibration of air cart volumetric meters.

BACKGROUND OF THE DISCLOSURE

Air seeding involves metering seed into an airstream generated by a fan. The metered seed is entrained in the airstream and directed towards an air seeding implement that distributes the airstream and entrained seed into a plurality of secondary airstreams with associated seed. The secondary airstreams and associated seed are directed into a furrow formed into the ground where the seed is deposited. The furrow is closed by the seeding implement.

SUMMARY OF THE DISCLOSURE

A first aspect of the present disclosure is directed to an apparatus for obtaining calibration information for a bulk material meter. The apparatus may include an air cart that may include a first bulk material tank and a first meter that meters bulk material received from the bulk material tank. The apparatus may also include a second meter that receives a portion of the bulk material and that is operated in a selected manner; and a scale that measures the received portion of the bulk material that is dispensed by the second meter. The air cart may be calibrated using the measured portion of bulk material passed through the second meter.

A second aspect of the present disclosure is directed to a method for calibrating a bulk material handling system of an air cart. The method may include feeding a bulk material from a first tank to a first meter associated with an air cart that includes a second meter used to dispense the bulk material during an agricultural operation, the first meter not utilized for dispensing the bulk material during the agricultural operation. The method may also include operating a first meter in a selected manner to dispense an amount of the bulk material, the first meter being associated with the air cart; measuring the dispensed amount of bulk material from the first meter; and calibrating the second meter using the measured amount of bulk material dispensed from the first meter.

The various aspects may include one or more of the following features. The air cart may be calibrated using a calibration factor that is determined from the measured portion of the bulk material dispensed by the second meter. The second meter may be attached to the air cart. The second meter may be located remote from the air cart. A second bulk material tank that contains the portion of the bulk material may be included. The second bulk material tank may be fed by the first bulk material tank. The air cart may also include a controller that controls operation of the first meter. The scale may be communicatively coupled to the controller, and the controller may calibrate the first meter using the measured portion of the bulk material measured by the scale. A motor may be operatively coupled to second meter and communicably coupled to the controller. The motor may be controlled by the controller to operate the second meter at the selected rate. The second meter may be identical to the first meter. Operation of the second meter may dispense a defined fractional amount of bulk material dispensed by the first meter for a selected number of cycles of operation. A collection container may receive the portion of the bulk material dispensed by the second meter when operating in the selected manner.

The various aspects may include one or more of the following features. Operating the first meter may include operating the first meter at a selected number of cycles. Operating the first meter may include operating the first meter at a selected speed. The first meter may be provided at a location on the air cart. The first meter may be provided at a location remote from the air cart. Calibrating the second meter with the measured amount of bulk material dispensed from the first meter may include calibrating the second meter with a calibration factor based on the measured amount of bulk material dispensed from the first meter. The calibration factor may be communicated to a controller of the air cart that performs the calibration of the second meter. Communicating the calibration factor to the controller of the air cart may include wirelessly communicating the calibration factor to the controller of the air cart. The first meter may be provided at least partially inside of a storage tank of the air cart.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
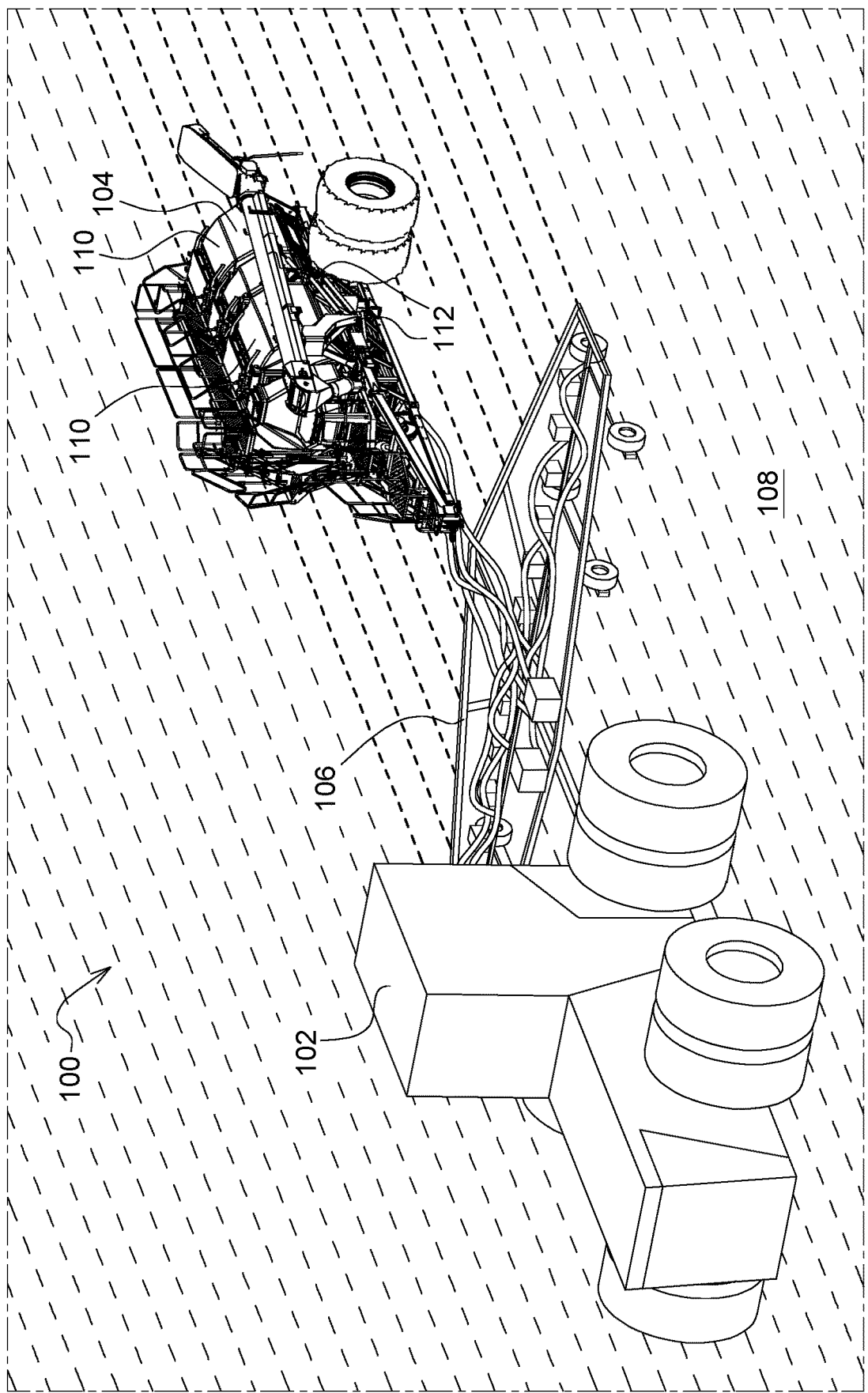
FIG. 1 is an oblique view of an example seeding train that includes a work vehicle, a seeding implement, and an air cart, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

Words of orientation, such as "up," "down," "top," "bottom," "above," "below," "leading," "trailing," "front," "back," "forward," and "rearward" are used in the context of the illustrated examples as would be understood by one skilled in the art and are not intended to be limiting to the disclosure. For example, for a particular type of vehicle or implement in a conventional configuration and orientation, one skilled in the art would understand these terms as the terms apply to the particular vehicle or implement.

For example, as used herein, with respect to a work vehicle, unless otherwise defined or limited, the term "forward" (and the like) corresponds to a forward direction of travel of the work vehicle over the ground during normal operation of the work vehicle. Likewise, the term "rearward" (and the like) corresponds to a direction opposite the forward direction of travel of the work vehicle.

Also as used herein, with respect to an implement or components thereof (which includes carts, such as air carts), unless otherwise defined or limited, the term "leading" (and the like) indicates a direction of travel of the implement during normal operation (e.g., the forward direction of travel of a work vehicle transporting an implement). Similarly, the term "trailing" (and the like) indicates a direction that is opposite the leading direction.

The present disclosure is directed to calibrating air seeder meters. Particularly, the present disclosure is directed to calibrating an air cart meter using another meter that is not utilized for disbursing material for a seeding operation. Air seeders encompass agricultural implements that includes one or more tanks containing bulk material, e.g., seeds, fertilizers, or other bulk materials for introduction to the ground, and one or more meters to dispense bulk material from the one or more tanks with or without ground engaging components to form a furrow into which the bulk material is deposited or ground engaging components to close a furrow. Example air seeders include air carts and as well agricultural implements that integrate an air carts and seeding implement. Consequently, the present disclosure is intended to encompass calibrating volumetric meters for any agricultural seeders, including air carts. Various examples are provided below in the context of air carts. However, the scope of the disclosure is not so limited. Rather, as explained earlier, the scope of the present disclosures encompasses other types of agricultural implements that utilize volumetric metering of a bulk commodity.

FIG. 1 is an oblique view showing a seeding train 100 that includes a work vehicle 102 (e.g., a tractor), an air cart 104 that carries bulk material (e.g., commodities such as seed and fertilizer) that are to be introduced into the soil of a field 108, and a seeding implement 106 that receives the bulk material from the air cart 104 and implants the bulk material into the ground. The air cart 104 includes tanks 110 and meters 112 that dispense bulk material from the tanks 110 in a controlled manner. Tanks, as used herein, are intended to encompass bins, hoppers, and other containers used to contain bulk materials.

Figure 2:
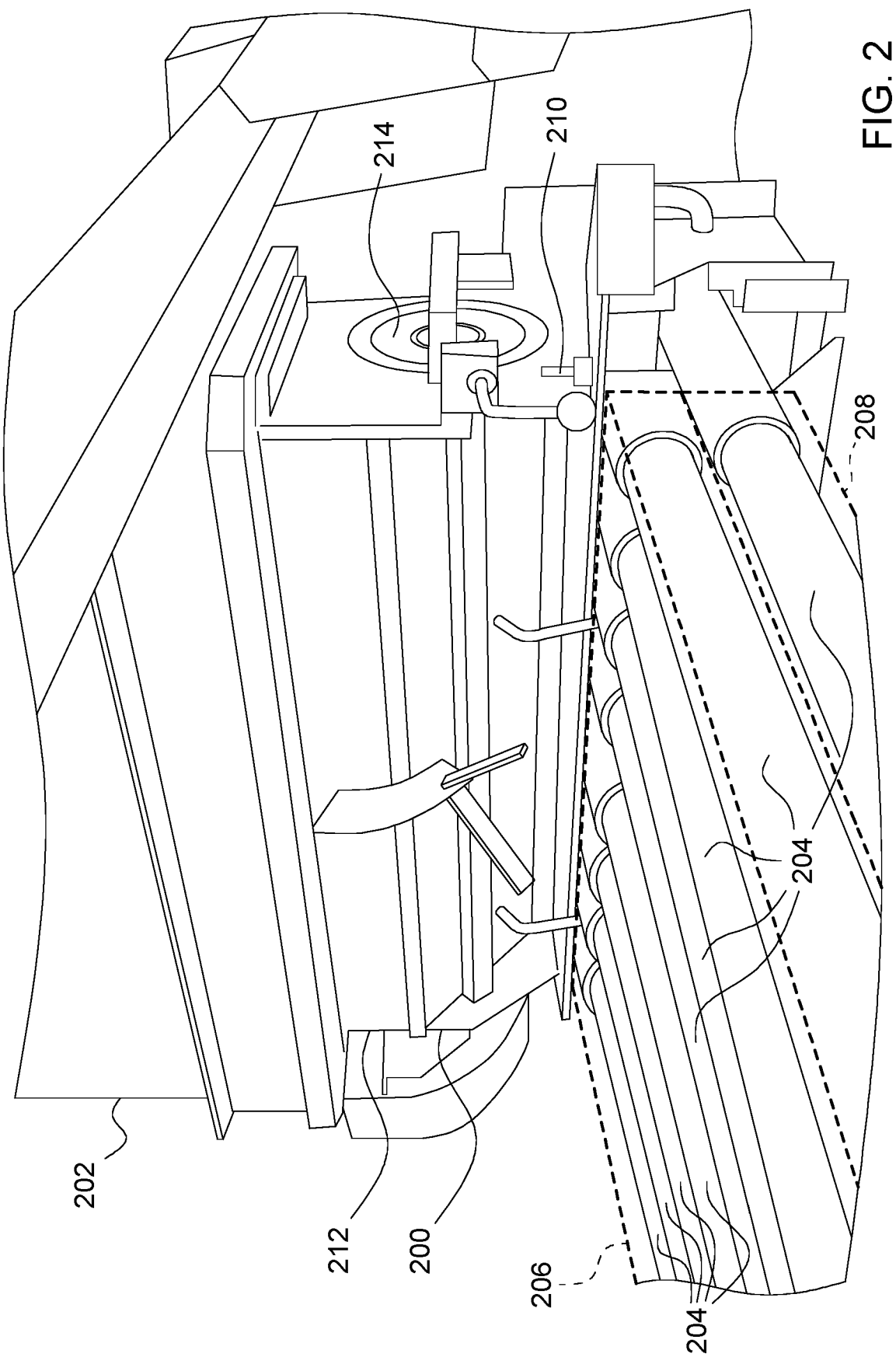
FIG. 2 is an oblique view of an example meter disposed adjacent to and in communication with the contents of a tank, according to some implementations of the present disclosure.

FIG. 2 is an oblique view of an example meter 200 disposed adjacent to and in communication with the contents of a tank 202, which may be similar to tank 110, of an air cart, such as air cart 104. The meter operates to dispense bulk material, e.g., seed, from a tank at a controlled rate in order to provide a desired amount of the bulk material to the air seeding implement. An amount dispensed by the meter 200 may be altered in response to, for example, a speed of the work vehicle, a size of the seeding implement (e.g., the number of row units of the seeding implement), and a desired rate of dispensing of seed into the ground.

The meter 200 dispenses seed to a plurality of conduits 204. In the illustrated example, the meter 200 is internally partitioned such that a bulk material, such as seed, dispensed from the tank 202 is divided into portions that are fed to the individual conduits 204. The conduits 204 provide a passage for an airstream that entrains the dispensed bulk material and conducts the entrained bulk material to a seeding implement, such as an air seeder, where the bulk material is introduced into the ground.

The conduits 204 are arranged in a first group 206 of laterally arranged conduits 204 and a second group 208 of laterally arranged conduits 204. In the context of FIG. 2, the second group 208 is located below the first group 206. A valve 210, such as a slide gate valve or flapper valve, directs the bulk material dispensed from the meter 200 to the first group 206 or the second group 208.

The example meter 200 includes a housing 212 and a cartridge 214 having a rotatable cylinder within the housing 212. The cylinder includes a plurality of cavities that collect a portion of the bulk material as the cylinder rotates. The bulk material collected in the cavities is released into the conduits 204 as the cylinder continues to rotate. As the rotational speed of the cylinder is altered, a rate at which the bulk material is released into the conduits 204 is correspondingly altered.

Figure 3:
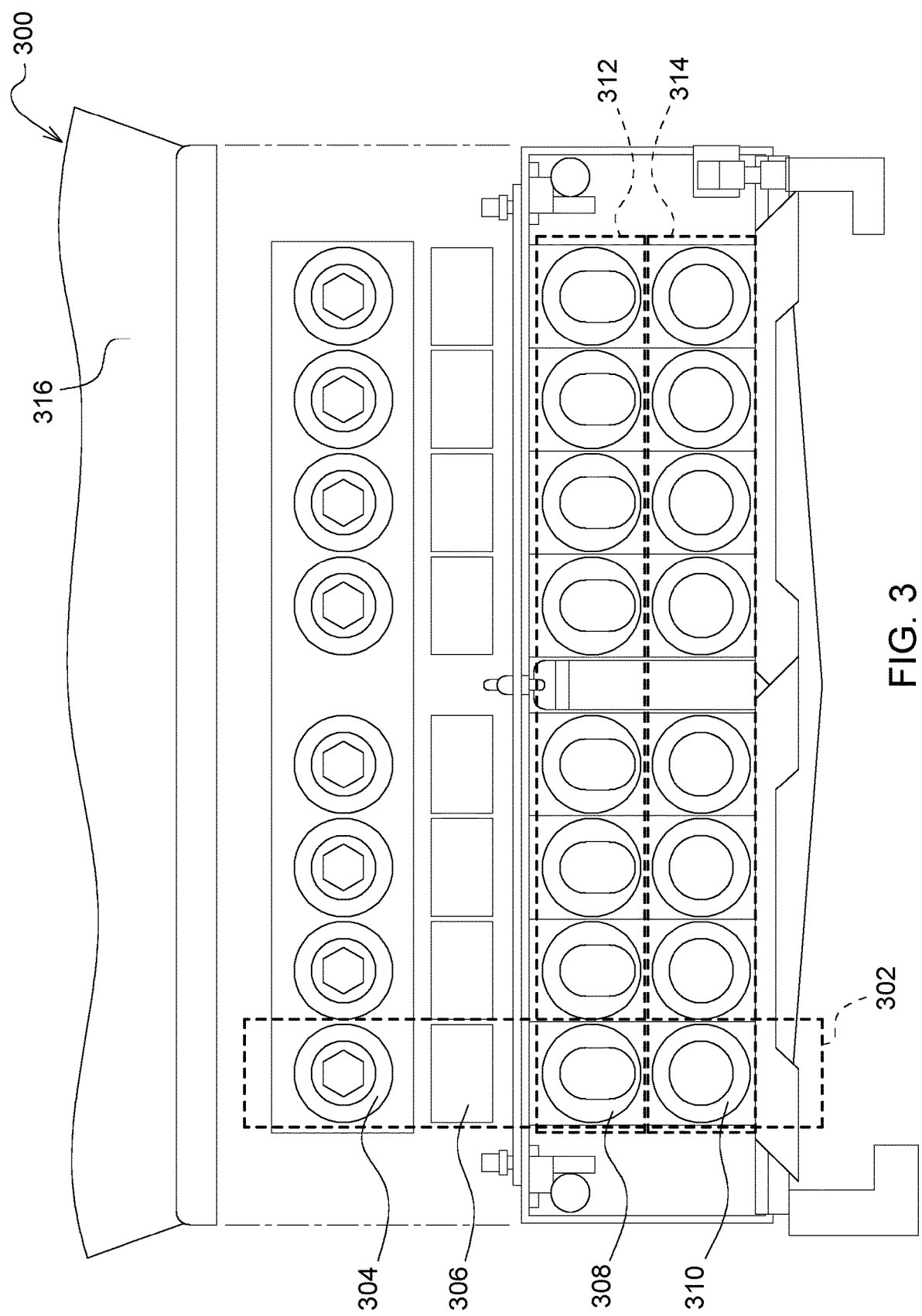
FIG. 3 is a schematic of another example meter assembly, according to some implementations of the present disclosure.

FIG. 3 is a schematic view of another example meter assembly 300 within the scope of the present disclosure. Rather than a single meter that spans laterally across the conduits, FIG. 3 shows an example meter assembly 300 that includes a plurality of individual meter subassemblies 302. In the illustrated example, each meter subassembly 302 includes a meter 304, a valve 306, a first conduit 308, and a second conduit 310. The valve 306 is movable to direct dispensed bulk material from the meter 304 to the first conduit 308 or the second conduit 310. In some instances, the valve 306 is a flapper valve. The first conduits 308 form a first group 312, and the second conduits 308 form a second group 314. A bulk material agitator 316 feeds bulk material to the meters 304.

Figure 4:
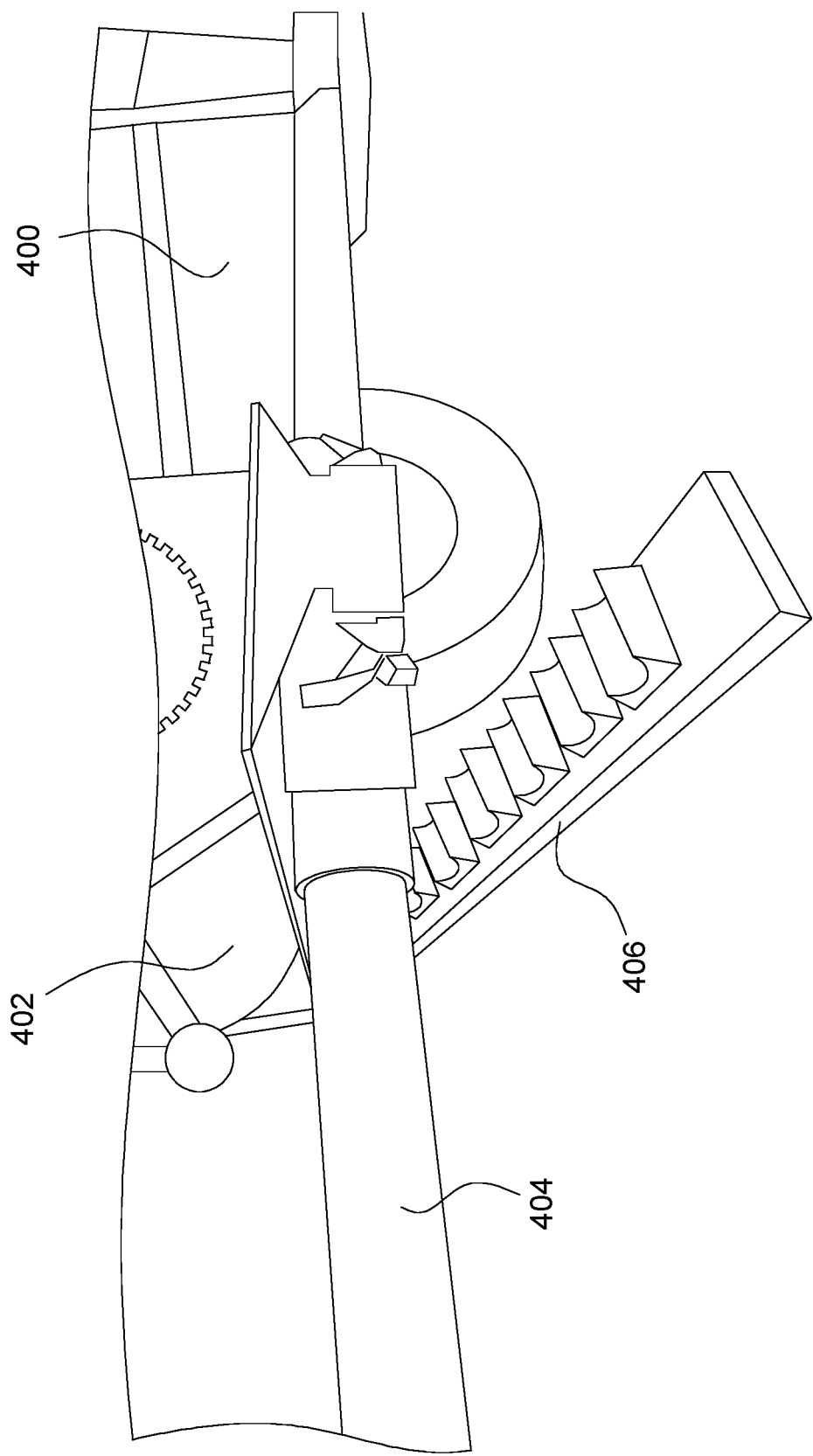
FIG. 4 is a detail view of another example air cart that shows a portion of a meter, conduits, and a cleanout door, according to some implementations of the present disclosure.

The apparatuses, systems, and methods described herein provide for improved calibration of a meter on an air cart. Conventionally, meter calibration for an air cart is a physically arduous and time-consuming operation. To calibrate an air cart meter currently, an operator crawls under an air cart to gain access to a cleanout door located under the conduits. FIG. 4 is a detail view of another example air cart 400 that shows a portion of a meter 402, conduits 404, and a cleanout door 406. The cleanout door 406 extends across, e.g., perpendicularly, the conduits 404 and encloses the conduits 404. To perform a calibration operation, the cleanout door, such as cleanout door 406, is removed, which is challenging for an operator due to, for example, the weight of the cleanout door, the size of the cleanout door, and the confined space between the cleanout door and the ground.

With the cleanout door removed, the operator attaches a collection container, such as a bag, at the location where the cleanout door was attached. Generally, the collection container extends laterally across the entirety of the conduits. The operator then operates the meter. Initially, the operator operates the meter for a selected number of revolutions in order to prime the meter. Generally, operation of the meter in this way is performed manually by the operator, such as by turning a crank. With the meter now primed, the operator removes and empties the collection container. This involved crawling underneath the air cart, disconnecting the collection container (which now includes additional weight), and ascending the air cart to dump the bulk material back into a tank of the air cart. The operator reinstalls the collection container to the conduits and then operates the meter again for a selected number of revolutions. Once again, operating the meter in this way generally involves turning a crank. The operator operates the meter for a selected number of revolutions. As the meter is operated, bulk material is released from the meter and into the collection container. The dispensed bulk material adds a considerable amount of weight to the bag. After the meter is operated, the operator, once again, crawls along the ground and detaches the collection container. The collection container is then weighed. Once weighed, the operator ascends to the top of the air cart and return the bulk material back into the tank from which the bulk material was dispensed. This process takes considerable time and effort from the operator. In some instances, this process is made even more laborious when the process is repeated several times to get an improved calibration result, and, with each repetition, the operator repeats these steps. Once calibration for the particular meter is completed, the cleanout door is reinstalled, which, again, requires the operator to manipulate a bulky, heavy component while crawling along the ground. Further, this process is repeated for each meter of the air cart for which calibration is sought.

The measured weight of bulk material collected in the collection container is then utilized to calibrate the meter. For example, the number of revolutions along with the associated weight of the bulk material dispensed as a result of those revolutions of the meter are used as a calibration factor and are inputted into a controller of the air cart. In some instances, the calibration factor is in the form of a meter displacement value (MDV) that relates an amount of bulk material (which may be in the units of weight) dispensed in response to a number of revolutions of a meter. For example, an MDV may be in the form of a number of pounds of bulk material that is dispensed per a selected number of revolutions of the meter, e.g., 0.60 pounds per revolution (lb./rev.) (0.27 kilograms per revolution (kg/rev.)).

As a result, the conventional approach to calibrating a meter of an air cart is time consuming, laborious, and uncomfortable for an operator. Further, the seeding operation is delayed until the calibration process is completed, and, without accurately calibrating the meter, dispensing of the bulk material during a seeding operation in controlled fashion is not possible.

The apparatuses, systems, and methods of the present disclosure avoids these problems. The present disclosure provides for a convenient calibration process that entails reduced effort and increased comfort for an operator and completion within a reduced amount of time. Further, calibration process within the scope of the present disclosure can be performed on the air cart or remotely from the air cart. Additionally, the process can be automated. Further, in some implementations, the present disclosure provides for calibration that results in a reduced amount of bulk material dispensing, which reduces the physical exertion that an operator must expend in order to return the dispensed bulk material back to the tank.

Figure 5:
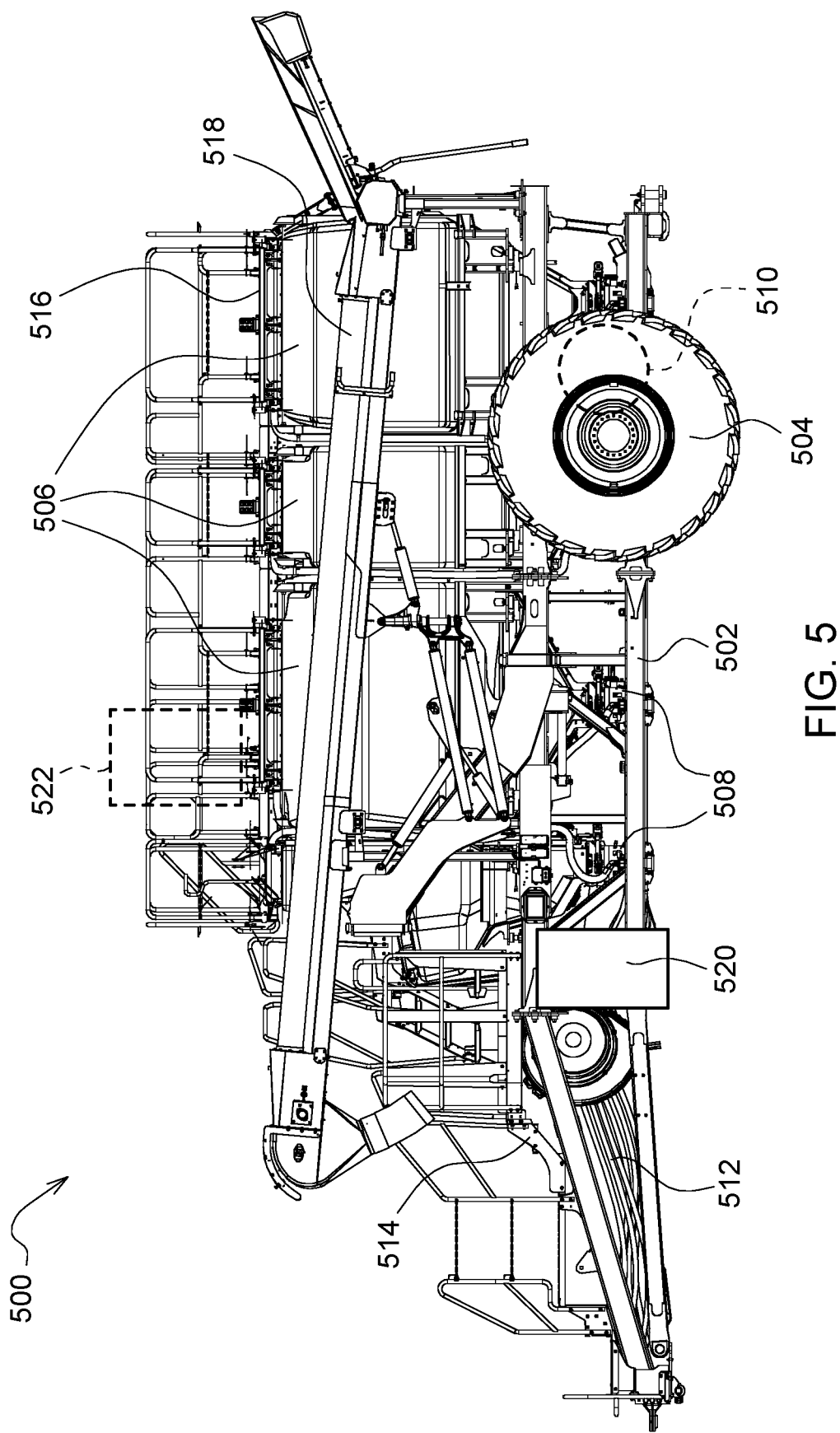
FIG. 5 is a side view of an example air cart, according to some implementations of the present disclosure.

FIG. 5 is a side view of an example air cart 500. The air cart 500 includes a frame 502, traction components 504 (such as wheel and tire assemblies) that operate to transport the air cart 500 to roll over the ground, tanks 506 coupled to the frame 502, meters 508 in communication with the interior of the tanks 506, conduits 510 in communication with the meters 508, and fans 510 in fluid communication with air conduits 512. The fans 510 blow air into the conduits 512. The air entrains and transports the bulk material dispensed from the meters 508 to a seeding implement, such as an air seeder, for introduction of the bulk material into the ground. The air cart 500 also includes a stairs 514 and a platform 516 coupled to the frame 502. The stairs 514 and platform 516 provide an operator with access to a top of the tanks 506 where an aperture for each tank is located. The apertures in the tanks 506 provide for filling of the tanks 506. The air cart 500 also includes a conveyor 518. The conveyor 518 is pivotably attached to the frame 502 and can be manipulated to convey bulk material to the apertures for filling the tanks 506 with bulk material from a source.

Figure 6:
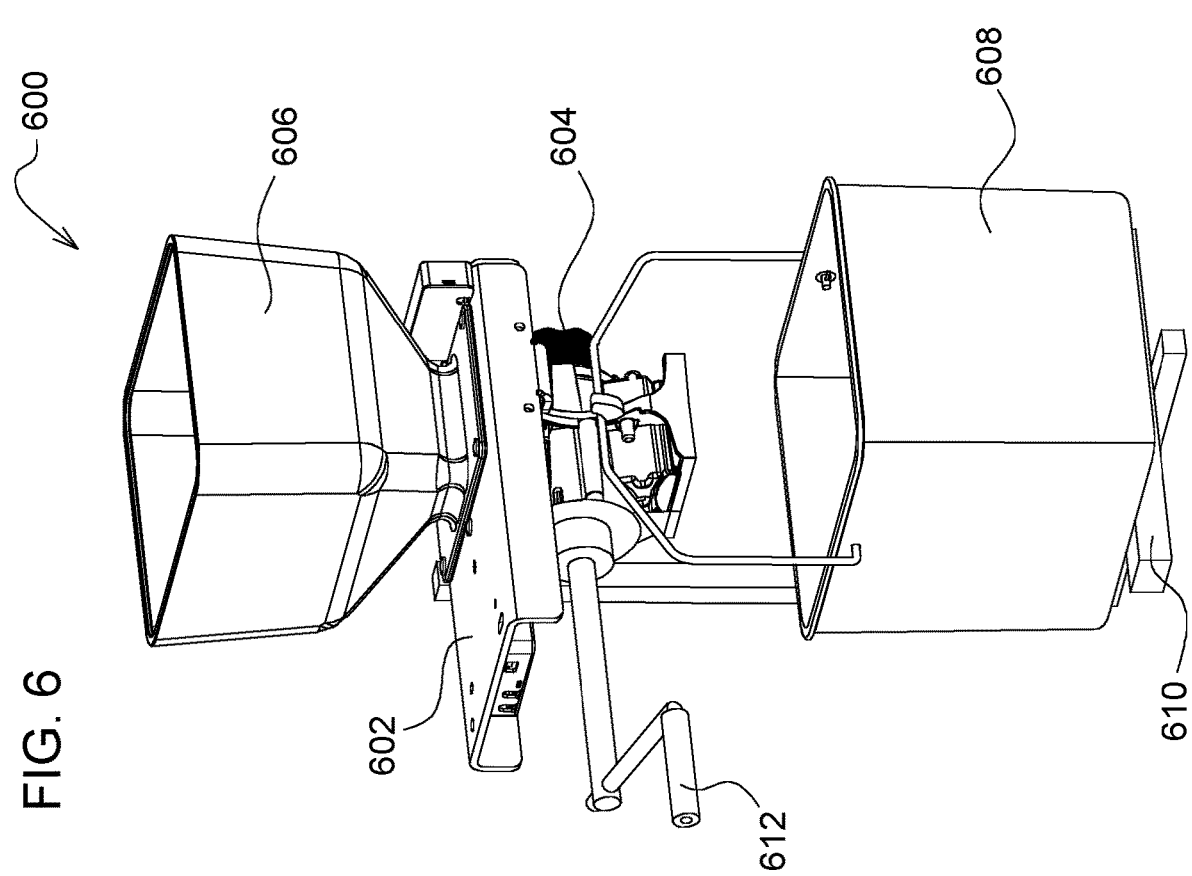
FIG. 6 is an oblique view of an example calibration meter system, according to some implementations of the present disclosure.

The air cart also includes a calibration meter system 520, illustrated schematically. In the illustrated example, the calibration meter system 520 is provided at a location along a side of the air cart 500. In other implementations, the calibration meter system 520 may located at a location along the platform 516, as indicated at 522, or, alternatively, at a location within one of the tanks 506. In still other implementations, the calibration meter system 520 is located remotely from the air cart 500. As indicated, the locations where the calibration meter system 520 may be positioned is conveniently located for use by an operator. Thus, in using the calibration meter system 520, an operator avoids having to crawl on the ground in a cramped space FIG. 6 is a detail view of an example calibration meter system 600, which may be similar to the calibration meter system 520. The calibration meter system 600 includes a frame 602, a meter 604 attached to the frame, a hopper 606 coupled to the meter 604, a collection container 608, and a scale 610. The frame 602 is coupled to a frame of an air cart, such as the frame 502 of air cart 500. The collection container 608 is removably coupled to the frame 602, allowing an operator to easily detach the collection container 608, such as to return bulk material contained within the collection container 608 to a tank of the air cart. In some implementations, the hopper 606 is filled manually by an operator, such as using a separate container (e.g., pail or bucket) containing bulk material. In other implementations, the hopper 606 is filled via a tank of an air cart, such as via a chute extending between the tank and the hopper 606.

The meter 604 is of the same type as that included on the air cart for dispensing bulk material from the tanks of the air cart. Thus, the performance of the meter 604 is identical to that of the meters used to dispense bulk material during a seeding operation. As a result, the meter 604 is used as a proxy for the meters installed on the air cart for dispensing bulk material during a seeding operation. In the illustrated example, the meter 604 includes a crank 612 to allow for manual operation of the meter 604. In other implementations, a meter of a calibration meter system is motorized such that the meter is operated automatically, as shown in FIG. 7.

Figure 7:
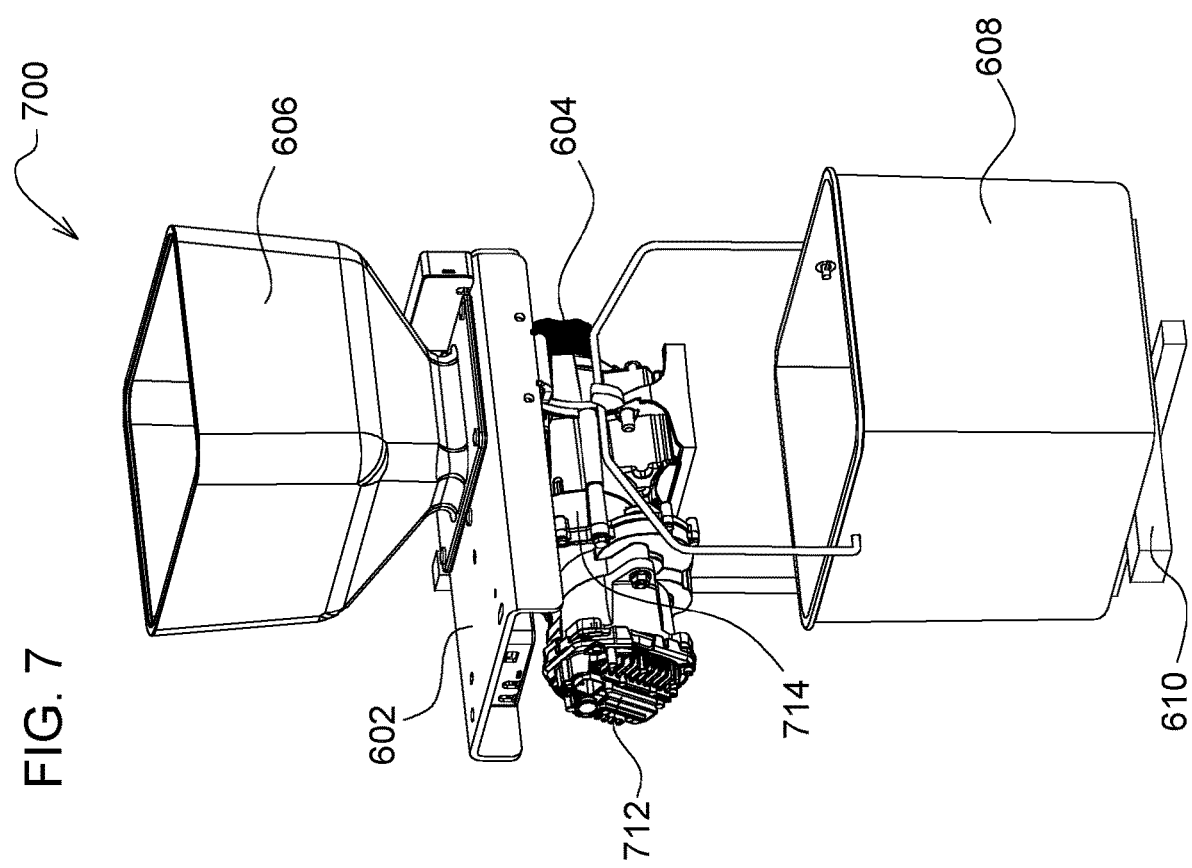
FIG. 7 is an oblique view of another example calibration meter system, according to some implementations of the present disclosure.

FIG. 7 shows another example calibration meter system 700 that includes a meter that is automatically operated. The calibration meter system 700 is similar to that of the calibration meter system 600 except that the calibration meter system 700 includes a motor 712 operably coupled to the meter 604. The motor 712 operates the meter 604, such as by rotating a cylinder within the meter 604 to dispense an amount of bulk material. In some implementations, a gearbox 714 is positioned between the motor 712 and the meter 604 to alter a rotational speed of the meter 604 relative to the operational speed of the motor 712. The motor 712 may be operated in response to signals received from a controller, such as computer system 1200 described in more detail below, or in response to input provided by an operator. In some implementations, the controller is operable to operate the meter for a selected number of cycles and, in some instances, at a selected rate of operation, e.g., a selected number of revolutions per minute (RPM). Example motors 712 include electric motors, hydraulic motors, or other types of motors, actuators, apparatuses, or devices operable to operate the meter 604 in a selected manner.

In some implementations, the scale 610 is a digital scale that senses a weight of the collection container 608 and bulk material introduced into the collection container 608 from the meter 604. In some implementations, the scale 610 is operable to account for the tare weight of the collection container 608 so that the weight output from the scale 610 is only that of the bulk material contained within the collection container 608.

In still other implementations, the scale 610 is positioned to sense the weight of the hopper 606. For example, in some instances, the scale 610 is disposed between the frame 602 and the hopper 606. In some instances, the scale 610 is coupled to the frame 602 and the hopper 606. An amount of material dispensed by the meter 604 is determined by sensing, with the scale 610, a first weight measurement of the hopper 606 prior to dispensing bulk material by the meter 604 and sensing a second weight measurement of the hopper 606 after an amount of the bulk material has been dispensed by the meter 604. A weight of bulk material dispensed by the meter 604 is determined by taking a difference between the first weight measurement and the second weight measurement.

In some implementations, the scale 610 is communicably coupled, via a wired or wireless connection, to a controller (which may be in the form of a computer system, such as a computer system 1200, described in more detail below) included on the air cart or remote from the air cart (such as a controller resident on a work vehicle that transports the air cart). The controller controls operation of the systems of the air carts, such as the fans and meters of the air cart. In other implementations, a bulk material weight sensed by the scale 610 is output to a user, such as via a display, and is manually input into the controller. In addition to the bulk material weight, the number of revolutions of the meter 604 that resulted in the dispensing of the bulk material into the collection container 608 is also inputted to the controller, whether directly via a wired or wireless connection or via a manual input by an operator. In some implementations, the number of cycles of operation of the meter 604, e.g., the number of revolutions, is stored in the controller and is used by the controller to both control the motor 712 that operates the meter 604 as well as to calculate the calibration factor or MDV. For example, in some instances, the controller is communicably coupled to the motor 712 used to operate the meter 604. The controller sends signals to operate the motor 712 a selected number of revolutions. The controller receives, from the scale 610, the bulk material weight dispensed by the meter 704 during the selected number of revolutions of the meter 604. In some implementations, such as where the scale 610 measures a weight of the hopper 604, the controller receives the first and second weight measurements from the scale 610 and computes the amount of bulk material dispensed by the meter 604 by subtracting the second weight measurement from the first weight measurement. The scale 610 transmits the weight information of the dispensed bulk material to the controller. The controller utilizes the bulk material weight dispensed from the meter 610 along with the number of revolutions of the meter 610 to determine the calibration factor.

In other implementations, an amount of bulk material dispensed by the meter may be determined in other ways. For example, a volume of material is sensed. In some implementations, volume is sensed using, for example, a level sensor, an ultrasonic sensor, or an image sensor. A detected volume is used, such as by a controller similar to a type described herein, to determine a correction factor for meter calibration.

The example calibration meter systems 600 and 700 include an individualize meter, similar to the meter 304 described above, that individually feeds a conduit. This stands in contrast to a single meter that dispenses bulk material to a plurality of conduits at the same time. Thus, the calibration meter systems 600 and 700 are used as a proxy for a metering system of an air cart that includes individualized meters, such as the meter 304 as described above in the context of FIG. 3. For a calibration, the meter included in the calibration meter system is identical to the meter present on the air cart for dispensing bulk material during a seeding operation. In such instances, a calibration factor obtained using a calibration meter system is used to calibrate the air cart meters because the performance of the meter onboard the air cart is identical to the meter in the calibration meter system. Consequently, the calibration factor obtained accurately represents the performance of the meter or meters present on the air cart for use during a seeding operation.

Further, in some instances, a cylinder or other metering component of a meter onboard the air cart can be inserted into the meter of the calibration meter system in order to provide a calibration that may be more accurate. Utilizing such a metering component of an onboard meter in this way may produce an improved calibration because inclusion of the metering component from the onboard meter takes into account wear that metering component has occurred over the life of the onboard meter. This variation between a used metering component of an onboard meter and a new or lesser used metering component of the meter of the calibration meter system may improve a calibration factor obtained from the calibration meter system. Upon completion of the calibration process, the metering component is returned to the onboard meter. In some instances, a calibration process can indicate whether a metering component is no longer performing within a desired specification. In some instances, when a calibration meter system determines that performance of a metering component fails to satisfy a desired specification, the calibration meter system can generate an alert, e.g., one of a visual, audible, or haptic alert, to a user that the metering component should be replaced.

However, the scope of the present disclosure is not limited to individualized meters. A similar calibration meter system may be used for a meter, such as meter 200 described earlier, that dispenses bulk material to multiple conduits at the same time. As explained above a meter such as meter 200 is partitioned such that bulk material dispensed from the meter is equally divided into a number of portions that corresponds to the number of conduits being fed by the meter. These divided portions are directed to the respective conduits by the meter partitions.

Figure 8:
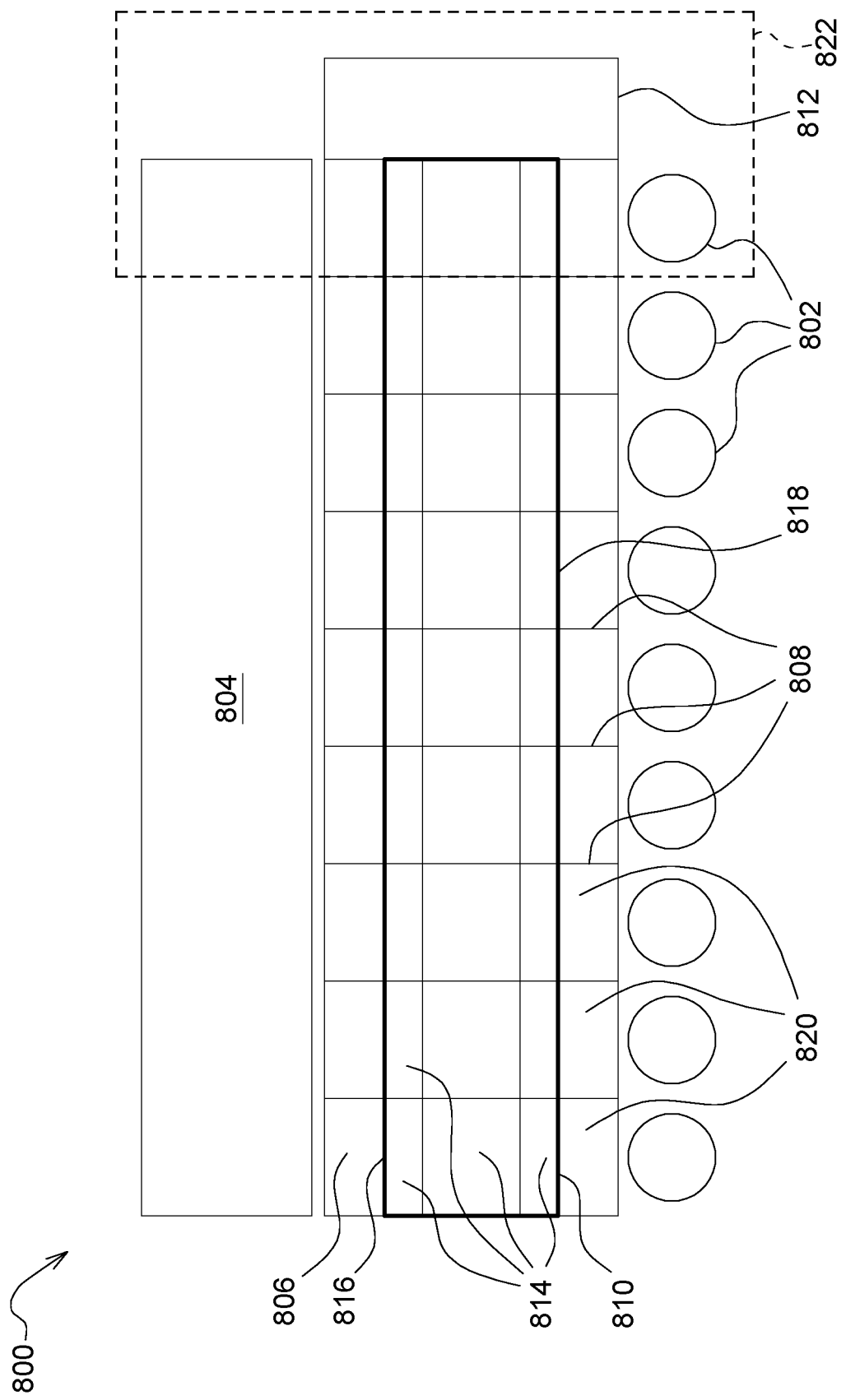
FIG. 8 is a schematic view of an example meter that dispenses bulk material to a plurality of conduits, according to some implementations of the present disclosure.

An example calibration meter system that accurately represents such a meter includes a meter that represents a fractional amount of the onboard meter. FIG. 8 illustrates this point. FIG. 8 is a schematic view of an example meter 800 that dispenses bulk material to a plurality of conduits 802. The bulk material is fed from a tank 804. The meter 800 includes an interior 806 that is partitioned by dividers 808, a rotatable cylinder 810 that meters the dispensing of the bulk material, and a drive system 812 that rotates the cylinder 810 at a selected speed. The dividers 808 divide the interior 806 into a plurality of compartments 820. The cylinder 810 defines a plurality of cavities 814. The cavities 814 are arranged to correspond to a particular compartment 820. As the cylinder 810 is rotated, the cavities receive bulk material from the tank 804 as the cavities 814 move past a first location 816 adjacent to the tank 804 and dispenses the received bulk material as the cavities 814 reach a second location 818 adjacent to the conduits 802.

Each compartment 820 corresponds to one of the conduits 802. Therefore, to accurately represent the meter 800 in a corresponding calibration meter system, a meter that represents one of the compartments 810, such as the portion of meter 800 identified at 822, is used. Such a calibration meter includes a drive system similar to the drive system 812 and a cylinder similar to the cylinder 810 that is sized to accommodate a compartment that represents one of the compartments 820. With a calibration meter system that includes a meter of this type, a calibration operation performed thereby would accurately represent the dispensing performance within each compartment 820 of the meter 800. Consequently, a calibration factor determined using a meter representing the portion of the meter 800 shown at 822 is usable to calibrate the meter 800 resident on an air cart for performing a seeding operation.

In the illustrated example, a meter on a calibration meter system corresponding to 822 would represent one-ninth of the meter 800, since the meter 800 includes nine compartments. Thus, the dispensing performance of such a meter as 822 would be multiplied by a factor of nine in order to obtain a calibration factor or MDV for the meter 800.

Figure 9:
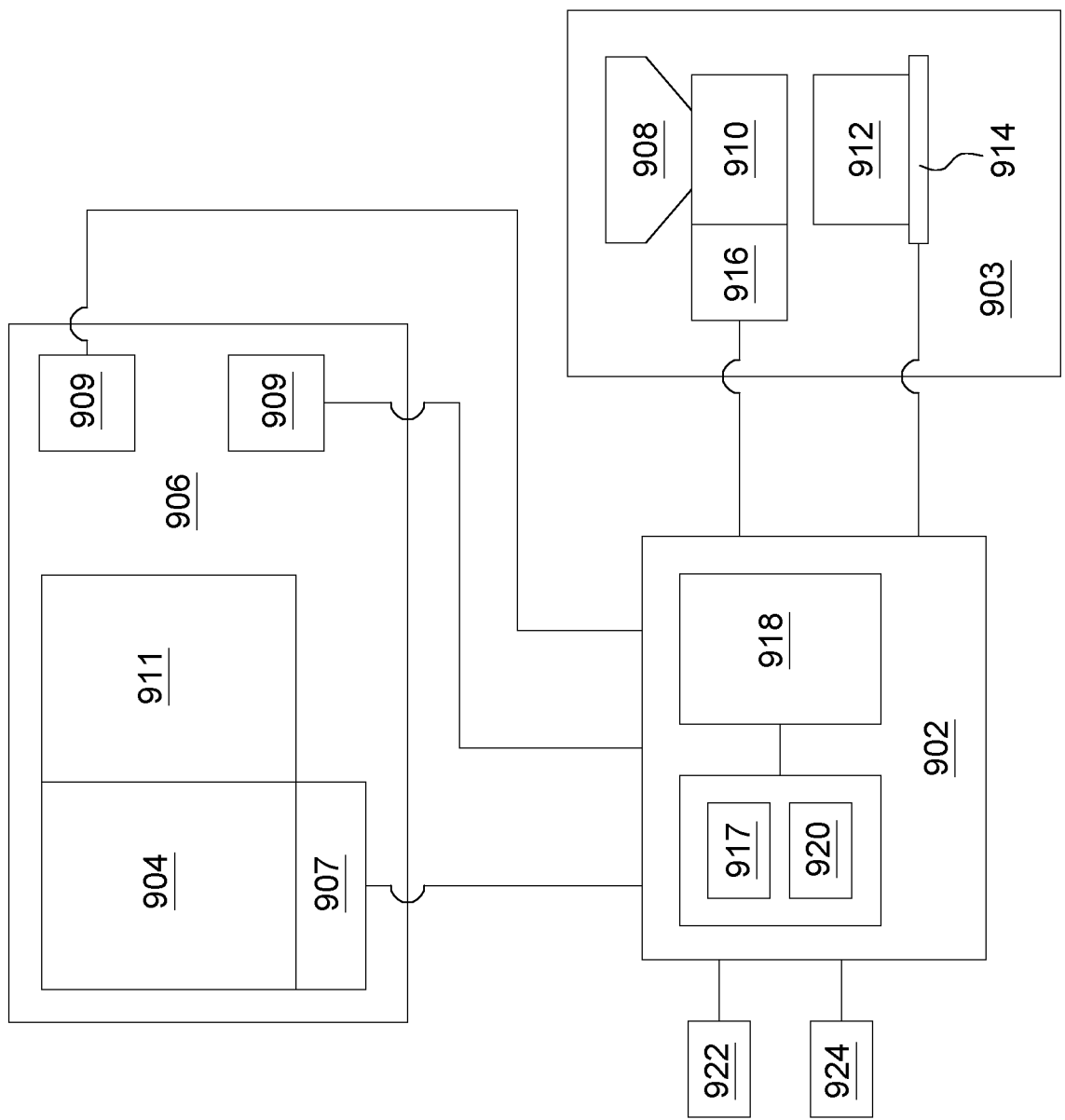
FIG. 9 is a schematic of an example calibration meter system, according to some implementations of the present disclosure.

FIG. 9 is a schematic of an example calibration system 900. The system 900 includes a controller 902 (which may be in the form of a computer system, such as computer system 1200, described in more detail below), a calibration meter system 903, and an air cart 906. The air cart 906 includes a meter 904, a drive system 907 used to operate the meter 904, fans 909, and a tank 911 that hold bulk material to be fed to and dispensed by the meter 904. The fans 909 generate an air flow through conduits of the air cart 906 that transports bulk material dispensed from the meter 904. In some implementations, the air cart 906 includes a plurality of meters 904, such as meter 304 described above, and each meter 904 has a corresponding drive system 907 (e.g., a motor or motor and gearbox). In other implementations, the meter 904 is similar to the meter 200, described above.

In some instances, the controller 902 is provided on the air cart 906. In other instances, the controller 902 is provided remotely from the air cart 906. For example, in some instances, the controller 902 is provided on a work vehicle that transports the air cart 906 during a seeding operation or at some other remote location. The calibration meter system 903 may be any calibration meter system within the scope of the disclosure, including the calibration meter systems 600 or 700 or a calibration meter system corresponding to the portion 822 of meter 800. The calibration meter system 903 includes a hopper 908, a meter 910, a collection container 912, and a scale 914. The meter 910 receives bulk material from the hopper 908 and dispenses the received bulk material into the collection container 912 as the meter 910 is operated. The scale 914 senses the weight of the dispensed bulk material. In the illustrated example, a motor 916, such as an electric motor, is operatively coupled to the meter 910. In other implementations, other types of motor are used. Further, in other implementations, the meter 910 is manually operated, such as by a crank as described earlier.

The controller 902 is communicatively coupled, via a wired or wireless connection, to the motor 916, the scale 914, the drive system 907, and fans 911. The controller 902 is operable to send and receive signals to control operation of the various components, such as the motor 916, the drive system 907, the scale 914, and the fans 911. The controller 902 also receives signals from the various components, such as signals from the scale 914 that represent a weight of bulk material dispensed form the meter 910.

The controller 902 includes a processor 917 that is communicably coupled to a memory 918. The memory 918 communicates with the processor 917 and is used to store programs and other software, information, and data. The processor 917 is operable to execute programs and software and receive information from and send information to the memory 918. Although a single memory 918 and a single processor 917 are illustrated, in other implementations, a plurality of memories, processors, or both may be used. Although the processor 917 and the memory 918 are shown as being local components of the controller 902, in other implementations, one or both of the processor 916 and memory 918 may be located remotely. Software 920, such as in the form of an application or program, is executed by the processor 916 to control operations of the various components communicably coupled to the controller 902 or receive and send messages thereto, as described in more detail below. Particularly, the software 920 includes instructions to operate the calibration meter system 903 to perform a calibration operation.

In the illustrated example, the system 900 also includes an input device 922 used to provide input into the controller 902. The input device 922 is communicably coupled via a wired or wireless connection. In some instances, the input device 922 is a touch screen display that is communicably coupled to the controller 902. The touch screen display is operable to display information, such as information associated with the system 900. Further, a user can physically interact with the touch screen display, such as by touching a screen of the touch screen display, to provide input into the controller 902. In some instances, the user interacts with the touch screen display via a graphical user interface (GUI) to provide input to the controller 902. GUIs included within the scope of the present disclosure are described in more detail below. In some instances, a separate display is communicably coupled to the controller 902 to output information to a user. Other types of input devices within the scope of the present disclosure include a keyboard, a mouse, or a joystick. In some implementations, a display 924 is communicably coupled to the controller 902 and is used, for example, to output information to a user.

In operation, an operator interacts with the input device 922 to initiate a calibration operation using the calibration meter system 903. In response, the controller 902 executes the software 920, causing control signals to be sent to the motor 916. The signals sent by the controller to the motor 916 causes the motor 916 to operate for a defined number of cycles. For example, in some instances, the controller 902 cause the motor 916 to rotate a selected number of revolutions. In some instances, the signals provided by the controller 902 also causes the motor 916 to rotate at a selected speed, such as a selected RPM.

In some instances, the controller 902 sends signals to the motor 916 to operate the motor 916 to perform a priming operation of the meter 910. For the priming operation, the signals from the controller 902 cause the motor 916 to operate for a selected number of cycles in order to prime the meter 910 prior to conducting the calibration operation. For example, with bulk material loaded into the hopper 908, the controller 902 sends signals to the motor 916 to operate the motor 916 for a selected number of cycle that cause bulk material to be dispensed from the meter 910 into the collection container 912. This preliminary operation of the meter 910 primes the meter with the bulk material. As a result of the priming operation, bulk material unrelated to the calibration operation is resident in the collection container 912. If unaccounted for, this amount of bulk material would skew the results of the calibration operation, rendering the results erroneous. Therefore, in some instances, the controller 902 receives signals from the scale 914 representing the weight of the collection container and the amount of bulk material dispensed during the priming operation. This weight represents the tare weight of the collection container, and the controller 902 stores this weight and takes the tare weight into consideration with respect to the weight of the collection container after completion of the calibration operation. For example, in some implementations, the controller 902 "zeros out" the scale 914 after completion of the priming operation in order take into account the tare weight of the collection container with the bulk material dispensed during the priming operation. With the tare weight taken into account, the dispensed weight of the bulk material after completion of the calibration operation is determinable and that weight is used to determine the calibration factor.

In other implementations, after completion of the priming operation, a notification may be provided on the display 924 instructing an operator to empty the collection container 912, such as by emptying the contents of the collection container 612, i.e., the bulk material, back into the hopper 908. The operator reinstalls the collection container 912. In some implementations, the controller 902 automatically recognizes reinstallation of the collection container, such as by output from a sensor (e.g., a position sensor) or by a signal received from the scale 914. In some implementations, the operator signals the return of the collection container by providing an input to the input device 924.

With the meter 910 primed and the collection container 912 in position to collect bulk material dispensed from the meter 910 during a calibration operation, the controller 902 sends signals to motor 916 to operate the meter 910 to obtain a calibration factor. The signals from the controller 902 cause the motor 916 to operate for a selected number of cycles (e.g., a selected number of revolutions). In some instances, the signals also defines a rate of operation of the motor, e.g., a selected RPM. In some implementations, the selected number of revolutions of the meter 910 in response to the motor 916 is between one and 10 revolutions. In other implementations, the number of revolutions is greater than 10. In some implementations, the rate of operation of the meter 910 in response to the motor 916 is between 1 RPM to 100 RPM. In some implementations, an operator interacts with the input device 922 to input the number of cycles to be performed by the meter 910 during a calibration operation and the rate of operation of the meter 910 during the calibration operation. In some instances, the input by the operator is displayed on the display 924. In some implementations, the number of rotations of the meter 910 to be performed during a calibration operation and a speed at which the meter 910 is to be operated during the calibration operation is stored in memory, such as the memory 918, and may be included as part of the software 920.

When the motor 916 completes the selected number of revolutions to result in the meter 910 being operated a selected number of cycles, the scale 914 transmits the sensed weight of the dispensed bulk material to the controller 902. As explained earlier, the weight of the collection container 912 itself and any material contained therein, such as weight associated with bulk material dispensed during a priming operation, has already been taken into consideration so that only the weight of the bulk material dispensed during the calibration operation, alone, is used by the controller to determine a calibration factor.

The controller 902 receives a signal representing a weight of the bulk material dispensed by the meter 910 during the calibration operation. The controller 902 uses the weight of the bulk material and the number of cycles the meter 910 operated to dispense that amount of bulk material to determine a calibration factor. As explained above, because the meter 910 of the calibration meter system 903 is either identical to the meter or meters 904 on the air cart 906 (e.g., in the context of individual meters, such as meter 304) or is a meter that accurately represents the meter or meters 904 on the air cart (e.g., in the context of a single meter dispensing material to a plurality of conduits, such as meter 200), the controller 902 applies the calibration factor to the meter or meters 904 on air cart 906 to operate the meter or meters 904 accurately during a seeding operation. The calibration operation may be performed a desired number of times in order to obtain an average calibration value based on the number of calibration operations performed. The controller 902 is operable to perform multiple calibration operations, receive the associated weight of bulk material dispensed during each the calibration operation, and determine a calibration factor using the results of the different calibration operations.

Upon completion of the calibration operation, the operator can empty bulk material contained in the hopper 908, the meter 910, and the collection container 912, such as by returning the contents to the tank 911 of the air cart 906. Returning the bulk material to the tank 911 is a simple task when the calibration meter system 903 is provided at a location on a platform, such as location 522 along the platform 516 shown in FIG. 5, near the openings for the tank 911. Where the calibration meter system 903 is located at a position on an air cart similar to location of calibration meter system 520 shown in FIG. 5, returning the bulk material involves ascending to the top of tank 911 and placing the bulk material into the tank 911.

Utilizing a calibration meter, such as meter 910, in this manner allows an operator to avoid the strenuous and time-consuming labor associated with calibrating a meter in a conventional manner.

As explained earlier, a calibration meter system within the scope of the present disclosure can be located on an air cart or remotely from an air cart and, with a meter representative of the meter or meters on the air cart, can accurately perform calibration operations for those meter or meters onboard of the air cart. For example, in a remotely located implementation, the calibration meter system can be placed in any convenient location, such as in a shop environment on a farm. In some implementations, a remotely located calibration meter system is in wireless communication with a controller of an air cart, such as the controller 902 of air cart 906. Thus, with the use of a sample of the bulk materials that are to be dispensed by an air cart during a seeding operation, an operator is able to perform calibration operations for each bulk material from the convenience of an indoor environment or at any other desired location. A user input device and display provided with the calibration meter system permits the operator to interact with the air cart controller remotely and initiate operations of the calibration meter system, including priming operations and calibration operations. The results of the calibration operations are transmitted to the air cart controller, and the controller uses that information to determine a calibration factor.

Figure 10:
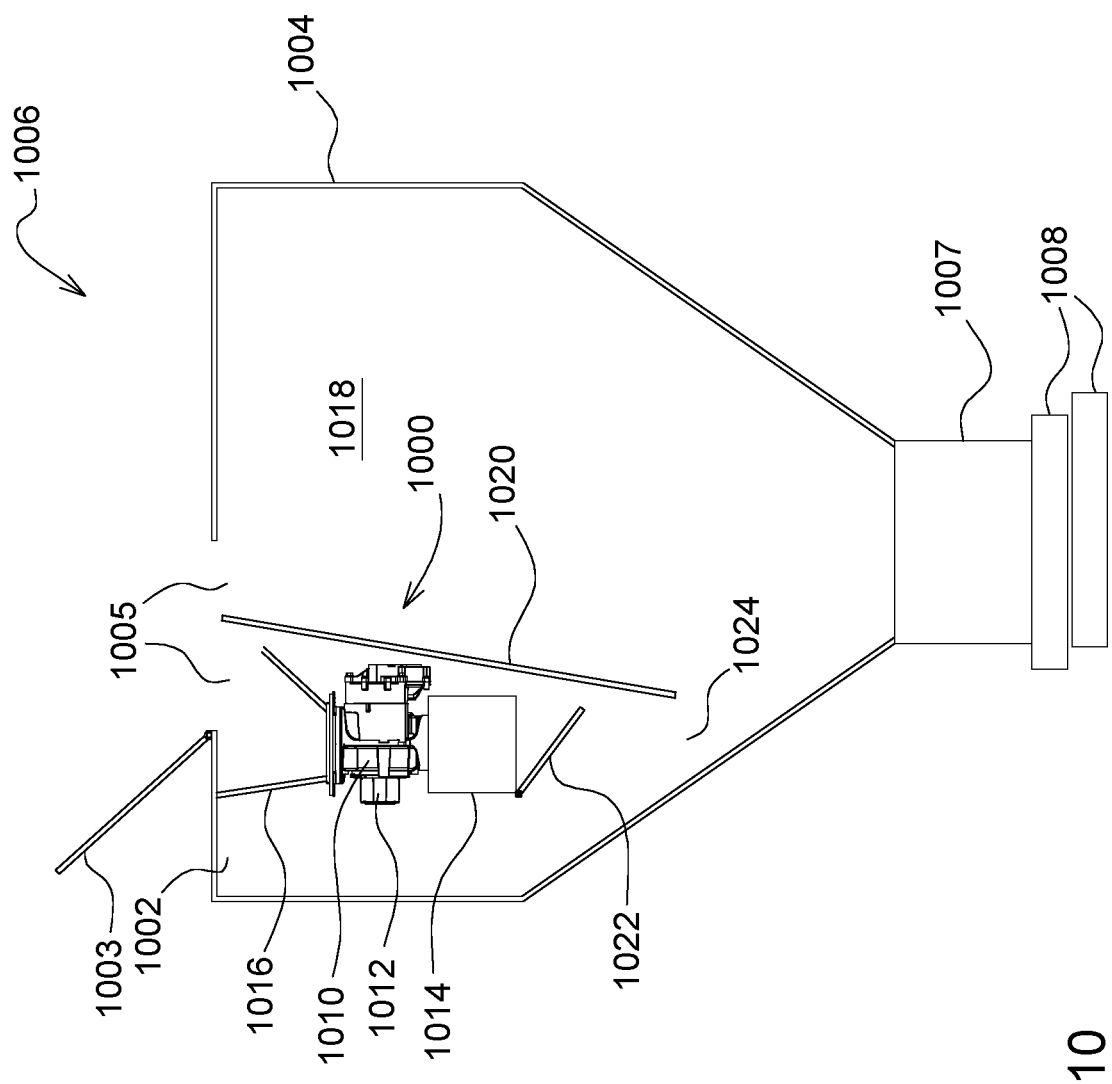
FIG. 10 is a schematic view of an example air cart in which a calibration meter system is located in a portion of a bulk material tank of the air cart, according to some implementations of the present disclosure.

As also mentioned earlier, a calibration meter system can be provided within a tank of an air cart. By including the calibration meter system in this way, bulk material dispensed during a calibration test can be easily introduced into the tank after measurement. FIG. 10 shows an example implementation in which a calibration meter system 1000 is located within a compartment 1002 formed within a tank 1004 of an air cart 1006. A moveable access door 1003 provides access to the compartment 1002 and, in the illustrated example, a remainder of the interior 1018 of the tank 1004 via an opening 1005. In other implementations, separate access doors are provided. The access door 1003 provides access to the calibration meter system 1000. The air cart 1006 includes a meter 1007 and conduits 1008, which may be similar to conduits 308 and 310, are disposed below the meter 1007. The calibration meter system 1000 includes a motor 1012 (e.g., an electric motor or other type of device or apparatus operable to operate the meter 1010), a meter 1010 representative of the meters on the air cart 1006 (or, at least the meter associated with the tank in which the calibration meter system 1000 is provided), and a collection container 1014. The tank 1004 forms a hopper 1016 above the meter 1010. In some implementations, the hopper 1016 is integral to the tank 1004. In other implementations, the hopper 1016 is a separate container disposed within the tank 1004. The compartment 1002 is separated from the remainder of an interior 1018 of the tank 1004 by a divider 1020. Bulk material is introduced into the hopper 1016 for calibration testing, such as during filling of the tank 1004.

The calibration meter system 1000 may form part of a system similar to system 900. Thus, in some implementations, a controller similar to controller 902, which may be a controller of the air cart 1006, controls the calibration meter system 1000. The controller is operable to perform priming operations and calibration operations of the calibration meter system 1000. Upon completion of a priming operation or a calibration operation, a door 1022 is opened to evacuate bulk material dispensed by the meter 1010 and collected in the collection container 1014. In some implementations, door 1022 forms a bottom of the collection container 1014. In other implementations, the door 1022 may be replaced by pivotably collection container. In some implementations, the controller is operable to open and close the door 1022 or pivot the collection container 1014 to empty the collection container 1014. The bulk material emptied from the collection container 1014 is directed into the remainder of the interior 1018 of the tank 1004 via an opening 1024. If additional bulk material remains in the hopper 1016 after completion of the calibration operation or operations, the hopper 1016 may be directly emptied into the remainder of the interior 1018 of the tank 1004 or the meter 1010 can be operated with the door 1022 open to pass all remaining bulk material out of the hopper 1016 and into the tank 1004 for a subsequent seeding operation. In some implementations, the motor 1012 is replaced with an apparatus that allows an operator to manually operate the meter 1010.

In this way, effort by an operator to calibrate a meter of an air cart is further reduced, as bulk material dispensed during a priming or calibration operation is automatically introduced into an interior portion of a tank of an air cart from which the bulk material is dispensed during a seeding operation. Additionally, an operator is able to avoid filling the hopper 1016 since the bulk material can be introduced into the hopper 1016 during a tank filling operation. In some implementations, the door 1022 or pivotably collection container 1014 is manually actuated, such as by an operator. Further, by performing a calibration operation inside of the tank 1004, weather (e.g., wind and precipitation) or other environmental factors that may affect calibration measurements are avoided.

Figure 11:
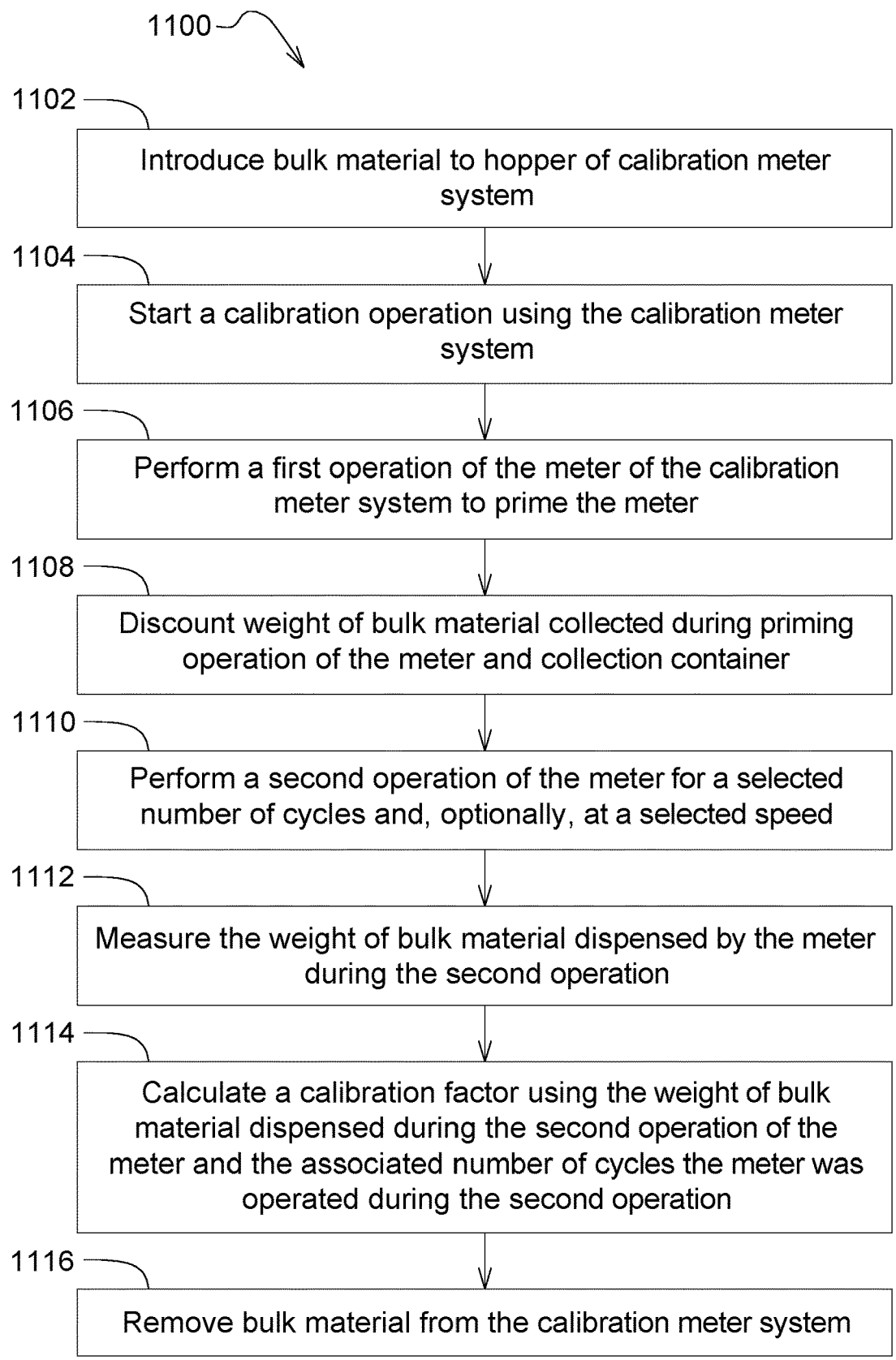
FIG. 11 a flowchart for an example method of performing a calibration operation, according to some implementations of the present disclosure.

FIG. 11 is a flowchart for an example method 1100 of performing a calibration operation. A calibration meter system, such as any calibration meter system described herein, can be utilized to perform the calibration operation. At 1102, bulk material is introduced into a hopper or other type of tank of a calibration meter system. The bulk material may be introduced during filling of a tank of an air cart or manually by an operator. At 1104, a calibration operation is initiated. A calibration operation may be initiated by an operated by interacting with an input device of a controller, which may be similar to controller 902. For example, an operator may interact with a GUI provided on a display, which may be a touch screen display. Alternatively, an operator may interact with another type of input device, such as a mouse, keyboard, knob, button, keypad, or other type of input device. At 1106, a first operation of the meter of the calibration meter system is performed to prime the meter. In some implementations, a controller initiates the priming operation by sending signals to a motor, e.g., an electric motor, coupled to a meter representative of a meter of an air cart for which calibration is desired. The signals cause the motor to operate the meter for a selected number of cycles, e.g., a selected number of revolutions. For example, in some implementations, the meter is operated for two or more revolutions. The signals may also define a speed at which the meter is to operate, such as by designating an RPM. In other implementations, the priming operation is performed manually by an operator, such as by turning a crank operably coupled to the meter. In some instances, the controller is operable to monitor a number of cycles that the meter has been manually operated and provide an indication to an operator when a selected number of cycles, e.g., revolutions, has been completed. The indication may be visual, audible, haptic, or a combination of these. In some implementations, upon completing the selected number of cycles, a drive component used to operate the meter of the calibration meter system may be disengaged, preventing operation of the meter beyond the selected number of cycles.

With the meter primed, at 1108, the weight of bulk material dispensed by the meter during priming and collection container is tared and, thus, discounted when determining a calibration factor. In some implementations, the bulk material dispensed during priming is emptied and the weight of the collection container is tared. At 1110, the controller performs a second operation of the meter a selected number of cycles, e.g., revolutions, and, optionally, at a selected speed (e.g., RPM). The bulk material dispensed by the meter is collected in the collection container. In some implementations, an operator manually operates the meter a selected number of cycles. In some instances, the controller monitors the number of cycles of the meter performed by the operator and provides an indication once the selected number of cycles is completed. In some implementations, upon completing the selected number of cycles, a drive component used to operate the meter of the calibration meter system may be disengaged, preventing operation of the meter beyond the selected number of cycles. At 1112, the weight of the bulk material dispensed by the meter is weighed by the scale (discounting the weight of the collection container and the weight of any bulk material dispensed during the priming operation) and transmits that weight to the controller. In some implementations, the weight measured by the scale is manually inputted to the controller via an input device. For example, the weight measured by the scale is displayed on a display, and the operator inputs the displayed weight value. The weight value inputted by the operator is transmitted to the controller. At 1114, the controller calculates the calibration factor (e.g., MDV) and stores the calibration factor. The calibration factor is used to control operation of a corresponding meter on an air cart during a seeding operation. At 1116, bulk material from the calibration meter system, such as any remaining bulk material in a hopper, the meter, and the bulk material in the collection container are emptied. In some implementations, the remaining bulk material is introduced into a tank of an air cart. Further, the calibration operation may be performed multiple times to obtain a calibration factor that may be more representative of the meter performance. The multiple calibration operations may be performed sequentially after priming of the meter.

The example method 1100 described can be applied to a calibration meter, via a calibration meter system, that is located on an air cart or located remotely from an air cart for which calibration is desired. For a calibration meter system located on an air cart, the calibration meter system may be communicably connected via a wired connection. However, in some implementations, an onboard calibration meter system may be communicably coupled via a wireless connection. In some implementations, information transmitted wirelessly to and from the calibration meter system to the controller are transmitted directly therebetween. In other implementations, the information is transmitted via indirectly, such as via the Internet and a remote server, satellite, or other communication pathway.

Without in any way limiting the scope, interpretation, or application of the claims appearing below, a technical effect of one or more of the example implementations disclosed herein is performing calibration of meter of an air cart with reduced physical effort and in less time. Another technical effect of one or more of the example implementations disclosed herein is the ability to perform the calibration of a meter of an air cart remotely from the air cart.

Figure 12:
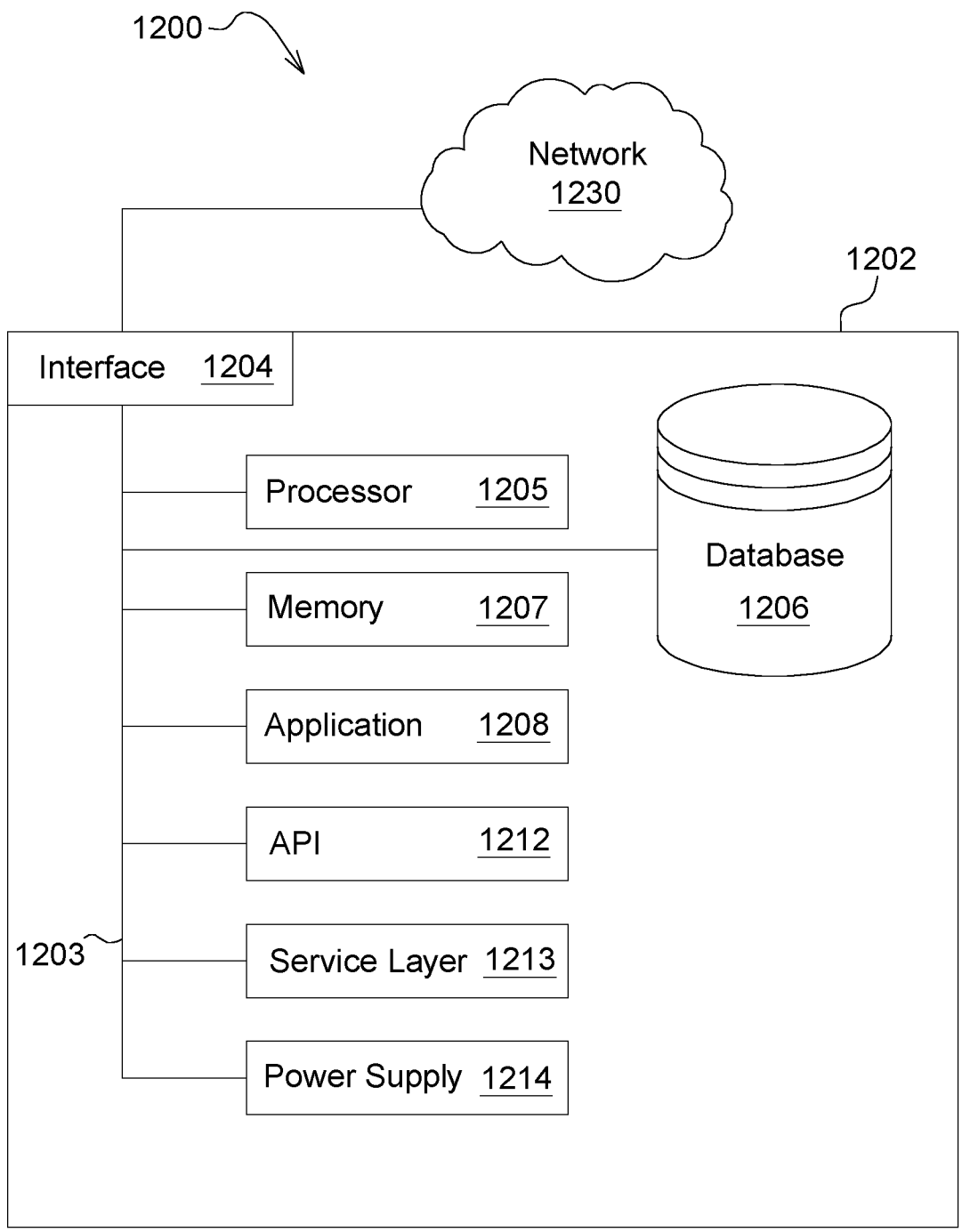
FIG. 12 is a block diagram illustrating an example computer system used to provide computational functionalities associated with described algorithms, methods, functions, processes, flows, and procedures as described in the present disclosure, according to some implementations of the present disclosure.

FIG. 12 is a block diagram of an example computer system 1200 used to provide computational functionalities associated with described algorithms, methods, functions, processes, flows, and procedures described in the present disclosure, according to some implementations of the present disclosure. The illustrated computer 1202 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1202 can include input devices such as keypads, keyboards, and touch screens that can accept user information. Also, the computer 1202 can include output devices that can convey information associated with the operation of the computer 1202. The information can include digital data, visual data, audio information, or a combination of information. The information can be presented in a graphical user interface (UI) (or GUI).

The computer 1202 can serve in a role as a client, a network component, a server, a database, a persistency, or components of a computer system for performing the subject matter described in the present disclosure. The illustrated computer 1202 is communicably coupled with a network 1230. In some implementations, one or more components of the computer 1202 can be configured to operate within different environments, including cloud-computing-based environments, local environments, global environments, and combinations of environments.

At a high level, the computer 1202 is an electronic computing device operable to receive, transmit, process, store, and manage data and information associated with the described subject matter. According to some implementations, the computer 1202 can also include, or be communicably coupled with, an application server, an email server, a web server, a caching server, a streaming data server, or a combination of servers.

The computer 1202 can receive requests over network 1230 from a client application (for example, executing on another computer 1202). The computer 1202 can respond to the received requests by processing the received requests using software applications. Requests can also be sent to the computer 1202 from internal users (for example, from a command console), external (or third) parties, automated applications, entities, individuals, systems, and computers.

Each of the components of the computer 1202 can communicate using a system bus 1203. In some implementations, any or all of the components of the computer 1202, including hardware or software components, can interface with each other or the interface 1204 (or a combination of both), over the system bus 1203. Interfaces can use an application programming interface (API) 1212, a service layer 1213, or a combination of the API 1212 and service layer 1213. The API 1212 can include specifications for routines, data structures, and object classes. The API 1212 can be either computer-language independent or dependent. The API 1212 can refer to a complete interface, a single function, or a set of APIs.

The service layer 1213 can provide software services to the computer 1202 and other components (whether illustrated or not) that are communicably coupled to the computer 1202. The functionality of the computer 1202 can be accessible for all service consumers using this service layer. Software services, such as those provided by the service layer 1213, can provide reusable, defined functionalities through a defined interface. For example, the interface can be software written in JAVA, C++, or a language providing data in extensible markup language (XML) format. While illustrated as an integrated component of the computer 1202, in alternative implementations, the API 1212 or the service layer 1213 can be stand-alone components in relation to other components of the computer 1202 and other components communicably coupled to the computer 1202. Moreover, any or all parts of the API 1212 or the service layer 1213 can be implemented as child or sub-modules of another software module, enterprise application, or hardware module without departing from the scope of the present disclosure.

The computer 1202 includes an interface 1204. Although illustrated as a single interface 1204 in FIG. 12, two or more interfaces 1204 can be used according to particular needs, desires, or particular implementations of the computer 1202 and the described functionality. The interface 1204 can be used by the computer 1202 for communicating with other systems that are connected to the network 1230 (whether illustrated or not) in a distributed environment. Generally, the interface 1204 can include, or be implemented using, logic encoded in software or hardware (or a combination of software and hardware) operable to communicate with the network 1230. More specifically, the interface 1204 can include software supporting one or more communication protocols associated with communications. As such, the network 1230 or the interface's hardware can be operable to communicate physical signals within and outside of the illustrated computer 1202.

The computer 1202 includes a processor 1205. Although illustrated as a single processor 1205 in FIG. 12, two or more processors 1205 can be used according to particular needs, desires, or particular implementations of the computer 1202 and the described functionality. Generally, the processor 1205 can execute instructions and can manipulate data to perform the operations of the computer 1202, including operations using algorithms, methods, functions, processes, flows, and procedures as described in the present disclosure.

The computer 1202 also includes a database 1206 that can hold data for the computer 1202 and other components connected to the network 1230 (whether illustrated or not). For example, database 1206 can be an in-memory, conventional, or a database storing data consistent with the present disclosure. In some implementations, database 1206 can be a combination of two or more different database types (for example, hybrid in-memory and conventional databases) according to particular needs, desires, or particular implementations of the computer 1202 and the described functionality. Although illustrated as a single database 1206 in FIG. 12, two or more databases (of the same, different, or combination of types) can be used according to particular needs, desires, or particular implementations of the computer 1202 and the described functionality. While database 1206 is illustrated as an internal component of the computer 1202, in alternative implementations, database 1206 can be external to the computer 1202.

The computer 1202 also includes a memory 1207 that can hold data for the computer 1202 or a combination of components connected to the network 1230 (whether illustrated or not). Memory 1207 can store any data consistent with the present disclosure. In some implementations, memory 1207 can be a combination of two or more different types of memory (for example, a combination of semiconductor and magnetic storage) according to particular needs, desires, or particular implementations of the computer 1202 and the described functionality. Although illustrated as a single memory 1207 in FIG. 12, two or more memories 1207 (of the same, different, or combination of types) can be used according to particular needs, desires, or particular implementations of the computer 1202 and the described functionality. While memory 1207 is illustrated as an internal component of the computer 1202, in alternative implementations, memory 1207 can be external to the computer 1202.

The application 1208 can be an algorithmic software engine providing functionality according to particular needs, desires, or particular implementations of the computer 1202 and the described functionality. For example, application 1208 can serve as one or more components, modules, or applications. Further, although illustrated as a single application 1208, the application 1208 can be implemented as multiple applications 1208 on the computer 1202. In addition, although illustrated as internal to the computer 1202, in alternative implementations, the application 1208 can be external to the computer 1202.

The computer 1202 can also include a power supply 1214. The power supply 1214 can include a rechargeable or non-rechargeable battery that can be configured to be either user- or non-user-replaceable. In some implementations, the power supply 1214 can include power-conversion and management circuits, including recharging, standby, and power management functionalities. In some implementations, the power-supply 1214 can include a power plug to allow the computer 1202 to be plugged into a wall socket or a power source to, for example, power the computer 1202 or recharge a rechargeable battery.

There can be any number of computers 1202 associated with, or external to, a computer system containing computer 1202, with each computer 1202 communicating over network 1230. Further, the terms "client," "user," and other appropriate terminology can be used interchangeably, as appropriate, without departing from the scope of the present disclosure. Moreover, the present disclosure contemplates that many users can use one computer 1202 and one user can use multiple computers 1202.

Described implementations of the subject matter can include one or more features, alone or in combination.

For example, in a first implementation, a computer-implemented method for calibrating a bulk material handling system of an air cart, the method including feeding a bulk material from a first tank to a first meter associated with an air cart that includes a second meter used to dispense the bulk material during an agricultural operation, the first meter not utilized for dispensing the bulk material during the agricultural operation; operating a first meter in a selected manner to dispense an amount of the bulk material, the first meter being associated with the air cart; measuring the dispensed amount of bulk material from the first meter; and calibrating the second meter using the measured amount of bulk material dispensed from the first meter.

The foregoing and other described implementations can each, optionally, include one or more of the following features:

A first feature, combinable with any of the following features, wherein operating the first meter includes operating the first meter at a selected number of cycles.

A second feature, combinable with any of the previous or following features, wherein operating the first meter includes operating the first meter at a selected speed.

A third feature, combinable with any of the previous or following features, wherein the first meter is provided at a location on the air cart.

A fourth feature, combinable with any of the previous or following features, wherein the first meter is provided at a location remote from the air cart.

A fifth feature, combinable with any of the previous or following features, wherein calibrating the second meter with the measured amount of bulk material dispensed from the first meter includes calibrating the second meter with a calibration factor based on the measured amount of bulk material dispensed from the first meter.

A sixth feature, combinable with any of the previous or following features, the method further including communicating the calibration factor to a controller of the air cart that performs the calibration of the second meter.

A seventh feature, combinable with any of the previous features, wherein the first meter is provided at least partially inside of a storage tank of the air cart.

In a second implementation, a non-transitory, computer-readable medium storing one or more instructions executable by a computer system to perform operations including feeding a bulk material from a first tank to a first meter associated with an air cart that includes a second meter used to dispense the bulk material during an agricultural operation, the first meter not utilized for dispensing the bulk material during the agricultural operation; operating a first meter in a selected manner to dispense an amount of the bulk material, the first meter being associated with the air cart; measuring the dispensed amount of bulk material from the first meter; and calibrating the second meter using the measured amount of bulk material dispensed from the first meter.

The foregoing and other described implementations can each, optionally, include one or more of the following features:

A first feature, combinable with any of the following features, wherein operating the first meter includes operating the first meter at a selected number of cycles.

A second feature, combinable with any of the previous or following features, wherein operating the first meter includes operating the first meter at a selected speed.

A third feature, combinable with any of the previous or following features, wherein the first meter is provided at a location on the air cart.

A fourth feature, combinable with any of the previous or following features, wherein the first meter is provided at a location remote from the air cart.

A fifth feature, combinable with any of the previous or following features, wherein calibrating the second meter with the measured amount of bulk material dispensed from the first meter includes calibrating the second meter with a calibration factor based on the measured amount of bulk material dispensed from the first meter.

A sixth feature, combinable with any of the previous or following features, computer-readable medium further storing one or more instructions executable by a computer system to perform operations including further including communicating the calibration factor to a controller of the air cart that performs the calibration of the second meter.

A seventh feature, combinable with any of the previous features, wherein the first meter is provided at least partially inside of a storage tank of the air cart.

In a third implementation, a computer-implemented system, comprising one or more processors and a non-transitory computer-readable storage medium coupled to the one or more processors and storing programming instructions for execution by the one or more processors, the programming instructions instructing the one or more processors to feed a bulk material from a first tank to a first meter associated with an air cart that includes a second meter used to dispense the bulk material during an agricultural operation, the first meter not utilized for dispensing the bulk material during the agricultural operation; operate a first meter in a selected manner to dispense an amount of the bulk material, the first meter being associated with the air cart; measure the dispensed amount of bulk material from the first meter; and calibrate the second meter using the measured amount of bulk material dispensed from the first meter The foregoing and other described implementations can each, optionally, include one or more of the following features:

A first feature, combinable with any of the following features, wherein the programming instructions instructing the one or more processor to operate the first meter includes programming instructions instructing the one or more processors to operate the first meter at a selected number of cycles.

A second feature, combinable with any of the previous or following features, wherein the programming instructions instructing the one or more processor to operate the first meter includes programming instructions instructing the one or more processor to operate the first meter at a selected speed.

A third feature, combinable with any of the previous or following features, wherein the first meter is provided at a location on the air cart.

A fourth feature, combinable with any of the previous or following features, wherein the first meter is provided at a location remote from the air cart.

A fifth feature, combinable with any of the previous or following features, wherein the programming instructions instructing the one or more processor to calibrate the second meter with the measured amount of bulk material dispensed from the first meter includes programming instructions instructing the one or more processor to calibrate the second meter with a calibration factor based on the measured amount of bulk material dispensed from the first meter.

A sixth feature, combinable with any of the previous or following features, the programming instructions further including programming instructions that instruct the one or more processors to communicate the calibration factor to a controller of the air cart that performs the calibration of the second meter.

A seventh feature, combinable with any of the previous features, wherein the first meter is provided at least partially inside of a storage tank of the air cart.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

Wireless connections within the scope of the present disclosure include wireless protocols, such as, 802.15 protocols (e.g., a BLUETOOTH®), 802.11 protocols, 802.20 protocols (e.g., WI-FI®), or a combination of different wireless protocols.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. An apparatus for obtaining calibration information for a bulk material meter, the apparatus, comprising:
an air cart comprising:
a first bulk material tank; and
a first meter that meters bulk material received from the first bulk material tank;
a second meter that receives a portion of the bulk material metered by the first meter and that is operated in a selected manner; and
a scale that measures the received portion of the bulk material that is dispensed by the second meter, the first meter being calibrated using the measured portion of bulk material passed through the second meter.

2. The apparatus of claim 1, wherein the air cart is calibrated using a calibration factor that is determined from the measured portion of the bulk material dispensed by the second meter.

3. The apparatus of claim 1, wherein the second meter is attached to the air cart.

4. The apparatus of claim 1, wherein the second meter is located remote from the air cart.

5. The apparatus of claim 1, further comprising a second bulk material tank that contains the portion of the bulk material.

6. The apparatus of claim 5, wherein the first bulk material tank and the second bulk material tank are the same.

7. The apparatus of claim 5, wherein the second bulk material tank is fed by the first bulk material tank.

8. The apparatus of claim 1, wherein the air cart further comprises a controller that controls operation of the first meter, wherein the scale is communicatively coupled to the controller, and wherein the controller calibrates the first meter using the measured portion of the bulk material measured by the scale.

9. The apparatus of claim 1, further comprising a motor operatively coupled to second meter and communicably coupled to the controller, the motor controlled by the controller to operate the second meter at the selected rate.

10. The apparatus of claim 1, wherein the second meter is identical to the first meter.

11. The apparatus of claim 1, wherein operation of the second meter dispenses a defined fractional amount of bulk material dispensed by the first meter for a selected number of cycles of operation.

12. The apparatus of claim 1, further comprising a collection container that receives the portion of the bulk material dispensed by the second meter when operating in the selected manner.

13. A method for calibrating a bulk material handling system of an air cart, the method comprising:
feeding a bulk material from a first tank to a first meter associated with an air cart that includes a second meter used to dispense the bulk material during an agricultural operation, the first meter not utilized for dispensing the bulk material during the agricultural operation;
operating the first meter in a selected manner to dispense an amount of the bulk material;
measuring the dispensed amount of bulk material from the first meter; and
calibrating the second meter using the measured amount of bulk material dispensed from the first meter.

14. The method of claim 13, wherein operating the first meter comprises operating the first meter at a selected number of cycles.

15. The method of claim 13, wherein operating the first meter comprise operating the first meter at a selected speed.

16. The method of claim 13, wherein the first meter is provided at a location on the air cart.

17. The method of claim 13, wherein the first meter is provided at a location remote from the air cart.

18. The method of claim 13, wherein calibrating the second meter with the measured amount of bulk material dispensed from the first meter comprises calibrating the second meter with a calibration factor based on the measured amount of bulk material dispensed from the first meter.

19. The method of claim 18, further comprising communicating the calibration factor to a controller of the air cart that performs the calibration of the second meter.

20. The method of claim 18, wherein communicating the calibration factor to the controller of the air cart comprises wirelessly communicating the calibration factor to the controller of the air cart.

21. The method of claim 13, wherein the first meter is provided at least partially inside of a storage tank of the air cart.

* * * * *